(12) United States Patent
Lim (10) Patent No.: US 12,259,704 B2
(45) Date of Patent: Mar. 25, 2025

(54) APPARATUS FOR CORRECTING ASSEMBLY DEVIATION OF AN APPARATUS AND CORRECTING A PROCESS ERROR USING AN APRILTAG, AND AN APPARATUS FOR CORRECTING AN ASSEMBLY DEVIATION OF THE APPARATUS AND CORRECTING A PROCESS ERROR USING THE SAME

(71) Applicant: REALOOK & COMPANY CO., LTD, Suwon-si (KR)

(72) Inventor: Nam Il Lim, Suwon-si (KR)

(73) Assignee: REALOOK & COMPANY CO., LTD, Suwon-si (KR)

( * ) Notice: Subject to any disclaimer, the term of this patent is extended or adjusted under 35 U.S.C. 154(b) by 217 days.

(21) Appl. No.: 17/742,482

(22) Filed: May 12, 2022

(65) Prior Publication Data

US 2023/0004137 A1    Jan. 5, 2023

(30) Foreign Application Priority Data

Jul. 2, 2021    (KR) ........................ 10-2021-0086980

(51) Int. Cl.
  *G05B 19/402*    (2006.01)
  *B23Q 15/12*    (2006.01)
  *G05B 19/4155*    (2006.01)
(52) U.S. Cl.
  CPC ........... *G05B 19/402* (2013.01); *B23Q 15/12* (2013.01); *G05B 19/4155* (2013.01); *G05B 2219/36088* (2013.01)

(58) Field of Classification Search
  None
  See application file for complete search history.

(56) References Cited

U.S. PATENT DOCUMENTS

| 10,788,804 B2 * | 9/2020 | Rivers ..................... G05B 19/19 |
| 2021/0373042 A1* | 12/2021 | Cherubini .............. G16H 10/40 |

FOREIGN PATENT DOCUMENTS

KR    10-2021-0057586 A    5/2021

* cited by examiner

*Primary Examiner* — Ryan A Jarrett
(74) *Attorney, Agent, or Firm* — Bridgeway IP Law Group, PLLC; Jihun Kim (57) ABSTRACT

An apparatus for correcting a process error includes: a frame; a machining unit formed inside or outside the frame with respect to the frame and performing a predetermined process; a conveying unit formed inside or outside the frame with respect to the frame and performing predetermined conveying; a sensing mark formed on the frame, the machining unit, or the conveying unit; an imaging unit formed inside or outside the frame and creating an original image by imaging the sensing mark; and a measuring unit deriving a 3D position variation value of the frame, the machining unit, or the conveying unit by deriving an image variation value of the sensing mark by analyzing the original image transmitted from the imaging unit imaging the sensing mark formed on the frame, the machining unit, or the conveying unit.

7 Claims, 6 Drawing Sheets

APPARATUS FOR CORRECTING ASSEMBLY DEVIATION OF AN APPARATUS AND CORRECTING A PROCESS ERROR USING AN APRILTAG, AND AN APPARATUS FOR CORRECTING AN ASSEMBLY DEVIATION OF THE APPARATUS AND CORRECTING A PROCESS ERROR USING THE SAME

BACKGROUND OF THE INVENTION

Field of the Invention

The present disclosure relates to an apparatus for correcting an assembly deviation and a process error thereof using a sensing mark, and a method of correcting an assembly deviation and process error using the apparatus. More specifically, the present disclosure relates to a technology of reducing in real time deviations that are caused by gaps and tolerances when an apparatus is assembled and driven by continuously monitoring in real time position variation values and angle variation values Ox, Oy, and Oz in X, Y, and Z axes of each of a frame, a machining unit, a conveying unit, an actuating unit, a measuring unit, a flexure, etc. that constitute the apparatus using sensing marks, such as an AprilTag, and a camera.

Description of the Related Art

Attempts to 3-dimensionally restore objects have been continuously made throughout the industry, and it is actually possible to 3-dimensionally restore objects with the development of computer vision technology. When a laser or pattern light is used in such attempts, there is a defect that the equipment is expensive and difficult to actually use while the accuracy is high. However, 3D restoration technologies that do not use an artificial light source have an advantage that the equipment is simple although the precision is low in comparison to an active type.

A method of using a camera of such attempts is actively studied due to improvement of the resolution and performance of cameras. This method may be classified into types such as Structure From Motion (SFM), stereo vision, and space carving that defines a space with voxels, projects the voxels to image, and keeps only voxels that satisfy consistency and visibility of colors. However, these types have a defect that they are difficult to apply when the restoration target has an insufficient texture or colors are almost similar.

On the other hand, an AprilTag, which is a visual reference that is useful in various types of work including augmented reality, robotics, and camera correction, makes it possible to easily create a target in common printers and to calculate accurate 3D position, direction, etc. of the tag through a camera using sensing software even if there is limitation in lighting or viewing angle.

An AprilTag is conceptually similar to a QR code in that it is a kind of 2D barcodes but is designed to encode less data payload (4-12 bits), so it is stronger and can be sensed in a longer range, whereby it is possible to calculate a 3D position with high accuracy in terms of detection rate and accuracy.

A localization method that is performed by a computer system has been disclosed in Korean Patent Application Publication No. 10-2021-0057586 (title of disclosure: Method and system for camera-based visual localization using blind watermarking). The computer system includes at least one processor configured to execute computer-readable instructions included in a memory, and the localization method includes: recognizing a combined image including an invisible marker from a query image; and calculating a pose of the query image on the basis of the identification tag of the marker and matched coordinates through the at least one processor.

CITATION LIST

Patent Literature

Patent Literature 1: Korean Patent Application Publication No. 10-2021-0057586

SUMMARY OF THE INVENTION

In order to solve the problems described above, an objective of the present disclosure is to minimize in real time deviations that are caused by gaps and tolerances when an apparatus is assembled and driven by continuously monitoring in real time position variation values and angle variation values θx, θy, and θz in X, Y, and Z axes of each of a frame, a machining unit, a conveying unit, a actuating unit, a measuring unit, a flexure, etc. that constitute the apparatus using sensing marks, such as an AprilTag, and a camera.

The objectives to be implemented in the present disclosure are not limited to the technical problems described above, and other objects that are not stated herein will be clearly understood by those skilled in the art from the following specifications.

In order the achieve the objectives described above, the present disclosure includes: a frame; a machining unit formed inside or outside the frame with respect to the frame and performing a predetermined process; a conveying unit formed inside or outside the frame with respect to the frame and performing predetermined conveying; a sensing mark formed on the frame, the machining unit, or the conveying unit; an imaging unit formed inside or outside the frame and creating an original image by imaging the sensing mark; and a measuring unit deriving a 3D position variation value of the frame, the machining unit, or the conveying unit by deriving an image variation value of the sensing mark by analyzing the original image transmitted from the imaging unit imaging the sensing mark formed on the frame, the machining unit, or the conveying unit.

In an embodiment of the present disclosure, the sensing mark may be an AprilTag, an Aruco marker, an ARtag, or an ARToolKit.

In an embodiment of the present disclosure, the measuring unit may transmit a control signal to the machining unit or the conveying unit so that a 3D position of the machining unit or the conveying unit is corrected in accordance with a 3D position variation value of the frame, the machining unit, or the conveying unit.

In an embodiment of the present disclosure, the sensing mark may be carved, printed, or attached.

In an embodiment of the present disclosure, a conveying unit coupled to the imaging unit and the frame and moving the imaging unit may be further included.

In an embodiment of the present disclosure, the measuring unit may sense lines in an image of the sensing mark in the original image using least square method (LSM) in clusters of similar pixel gradients.

In an embodiment of the present disclosure, the measuring unit may derive a 3D position variation value of the frame, the machining unit, or the conveying unit having a sensing mark by analyzing 3D inclination or movement of the sensing mark.

In order to achieve the objectives described above, the present disclosure includes: a first step in which an original image of the sensing mark is taken by the imaging unit; a second step in which the measuring unit derives an image variation value of the sensing mark by analyzing the original image transmitted from the imaging unit; a third step in which the measuring unit derives a 3D position variation value of the machining unit; and a fourth step in which the measuring unit transmits a control signal to the machining unit, whereby the 3D position of the machining unit is corrected.

DETAILED DESCRIPTION OF THE PREFERRED EMBODIMENTS

Hereinafter, the present disclosure is described with reference to the accompanying drawings. However, the present disclosure may be modified in various different ways and is not limited to the embodiments described herein. Further, in the accompanying drawings, components irrelevant to the description will be omitted in order to clearly describe the present disclosure, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

The terminology used herein is for the purpose of describing particular embodiments only and is not intended to limit the present disclosure Singular forms are intended to include plural forms unless the context clearly indicates otherwise. It will be further understood that the terms "comprise" or "have" used in this specification specify the presence of stated features, numerals, steps, operations, components, parts, or a combination thereof, but do not preclude the presence or addition of one or more other features, numerals, steps, operations, components, parts, or a combination thereof.

Hereinafter, the present disclosure is described in detail with reference to the accompanying drawings.

Figure 1:
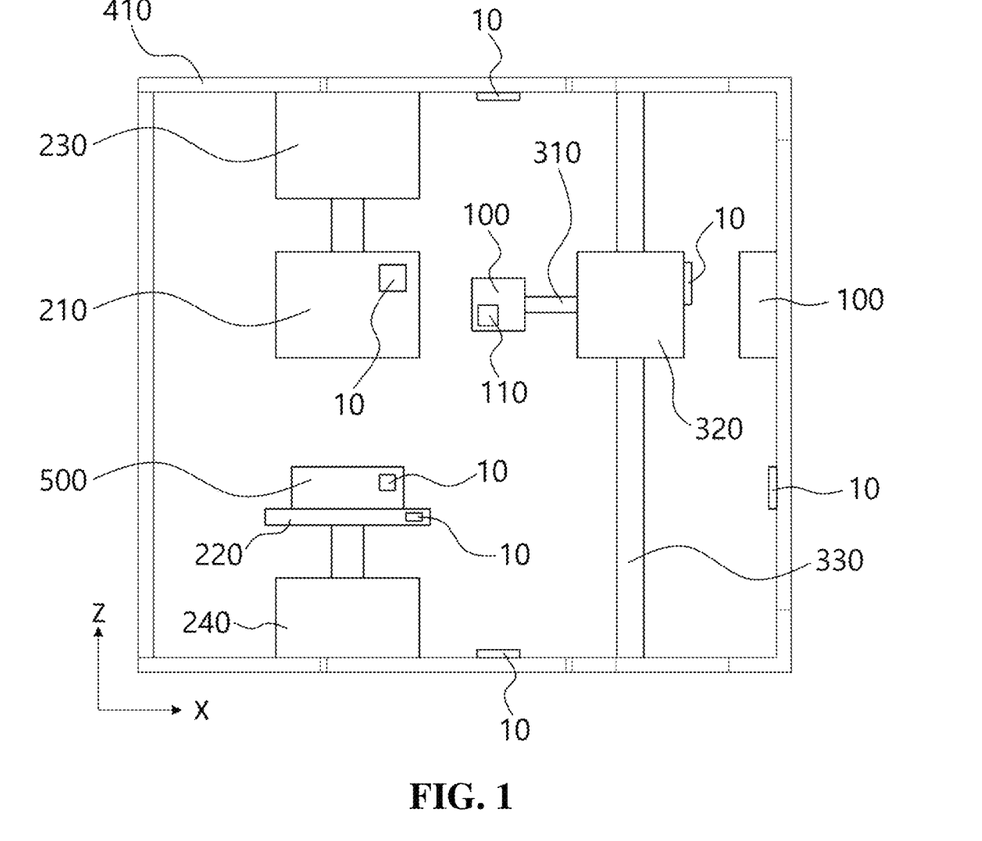
FIG. 1 is schematic view of an apparatus according to an embodiment of the present disclosure.
Figure 2:
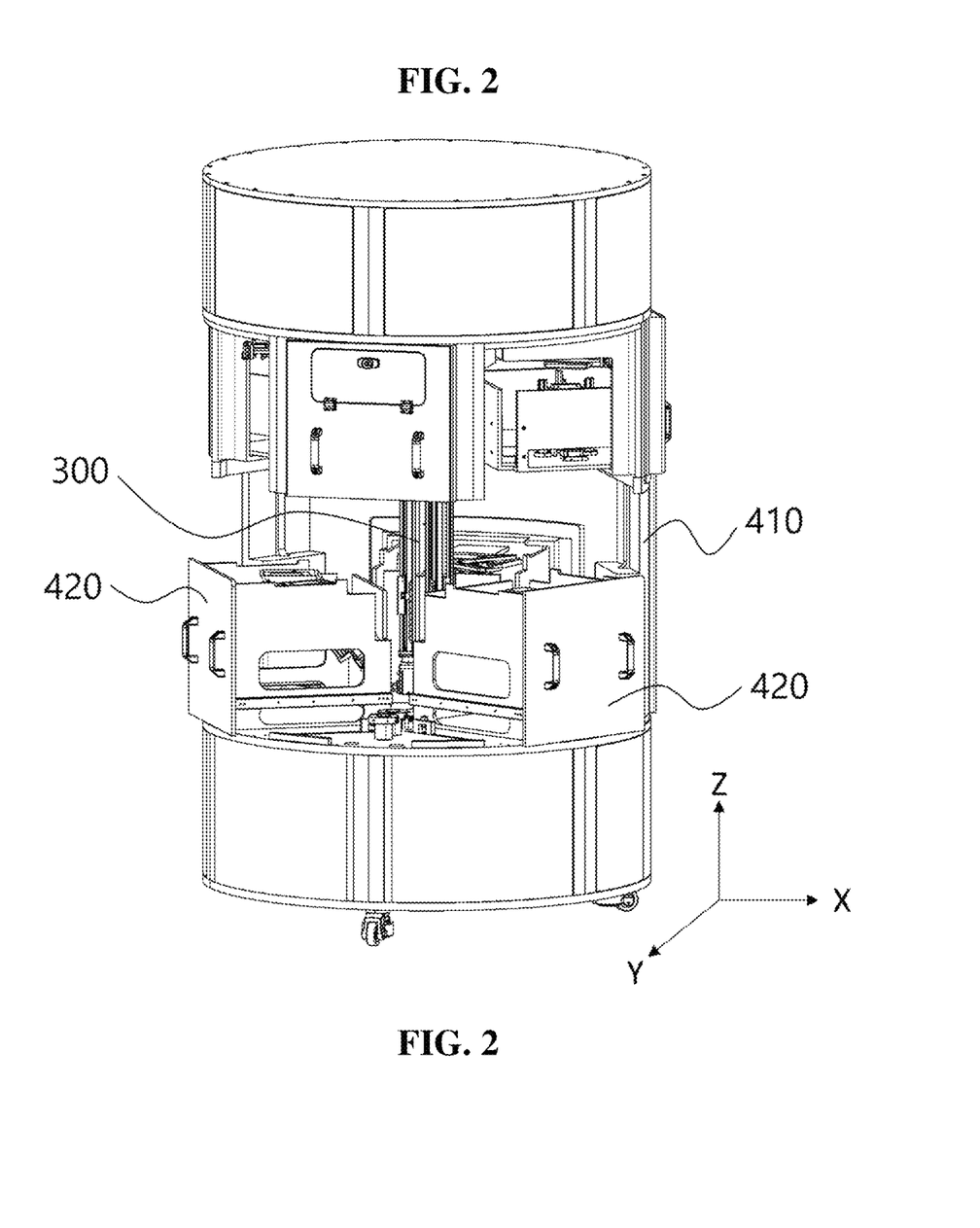
FIG. 2 is a perspective view of an apparatus according to another embodiment of the present disclosure.
Figure 3:
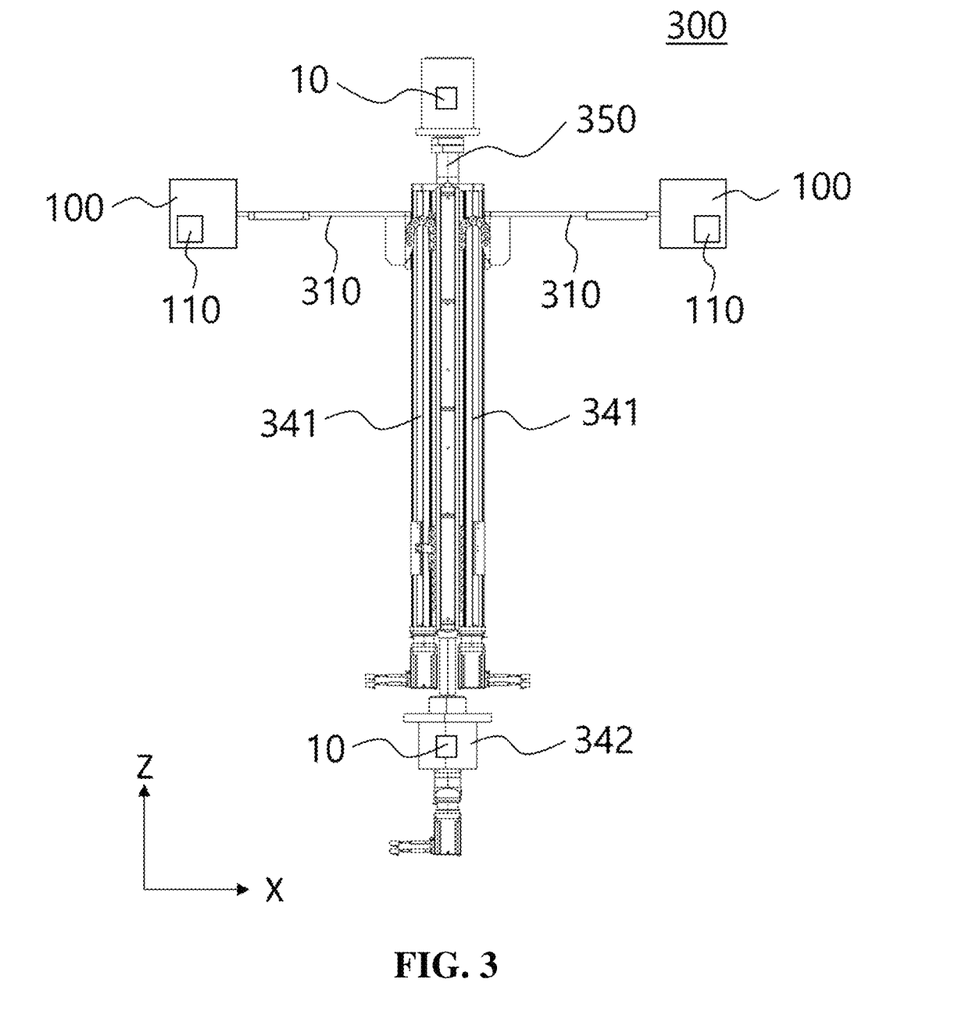
FIG. 3 is a schematic diagram of a conveying unit according to another embodiment of the present disclosure.
Figure 4A:
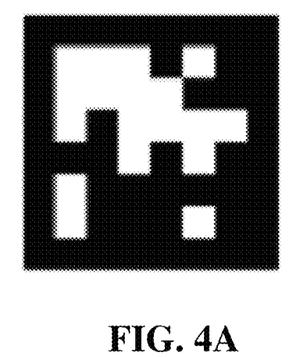
FIGS. 4A-4D and 5A-5D are images of sensing marks according to a plurality of embodiments of the present disclosure.
Figure 4B:
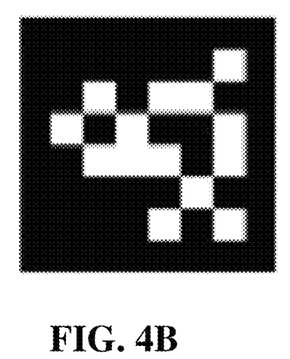
Figure 4C:
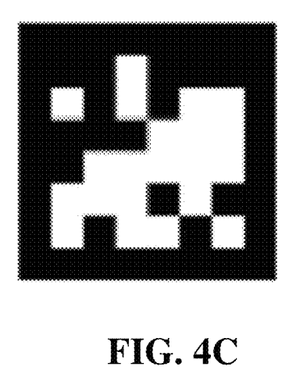
Figure 4D:
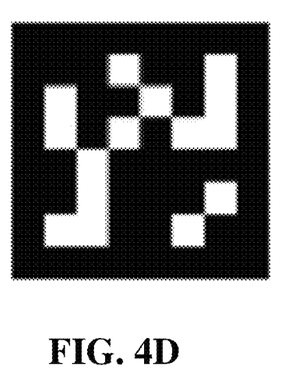

FIG. 1 is schematic view of an apparatus according to an embodiment of the present disclosure, and FIG. 2 is a perspective view of an apparatus according to another embodiment of the present disclosure. FIG. 3 is a schematic diagram of a conveying unit 300 according to another embodiment of the present disclosure.

As shown in FIGS. 1 and 2, an apparatus for correcting a process error of the present invention includes: a frame 410; a machining unit formed inside or outside the frame 410 with respect to the frame 410 and performing a predetermined process; a conveying unit formed inside or outside the frame 410 with respect to the frame 410 and performing predetermined conveying; a sensing mark 10 formed on the frame 410, the machining unit, or the conveying unit 300; an imaging unit 100 formed inside or outside the frame 410 and creating an original image by imaging the sensing mark 10; and a measuring unit deriving a 3D position variation value of the frame 410, the machining unit, or the conveying unit 300 by deriving an image variation value of the sensing mark 10 by analyzing the original image transmitted from the imaging unit 100 imaging the sensing mark 10 formed on the frame 410, the machining unit, or the conveying unit 300.

The sensing mark 10 installed on the conveying unit 300 may be imaged with the conveying unit 300 stopped.

The sensing mark 10 may be an AprilTag, an Aruco marker, an ARtag, or an ARToolKit. The sensing mark 10 is described as being limited to the types described above in an embodiment of the present disclosure, but it is apparent that the sensing mark 10 is not necessarily limited thereto and other 2D barcodes that can perform the same function may be used.

As shown in FIG. 1, the machining unit may include a machining tool 210 that is a tool for machining a machining target 500, a machining base 220 supporting the machining target 500, a tool actuator 230 coupled to the machining tool 210 and 3-dimensionally moving or rotating the machining tool 210, and a base actuator 240 coupled to the machining base 220 and 3-dimensionally moving or rotating the machining base 220.

The machining tool 210, the machining base 220, the tool actuator 230, and the base actuator 240 each may have a multi-axis robot or an orthogonal robot, and the machining unit may be partially or entirely installed inside or outside the frame with respect to the frame. The case in which the machining unit is formed inside the frame is described in the present disclosure for the convenience of description. The machining unit may be a component including all equipment including actuating equipment, flexure, etc. required for machining.

The sensing mark 10 may be formed on each of the components constituting the machining unit, as described above, the frame 410, etc., and the sensing mark 10 may be carved, printed, or attached.

In detail, the sensing mark 10 may be carved on each surface by a laser, etc., or the sensing mark 10 may be printed on each surface. Alternatively, the sensing mark 10 may be installed by carving or printing a sensing mark 10 on a substrate and attaching the substrate to each surface.

The conveying unit 300 is coupled to the imaging unit 100 and the frame 410 and can move the imaging unit 100. The conveying unit 300 may include a supporting arm 310 coupled to the imaging unit 100 and supporting the imaging unit 100, a driver 320 coupled to the supporting arm 310 and 3-dimensionally moving or rotating the supporting arm 310, and a support 330 coupled to the driver 320 and supporting the driver 320. The driver 320 may move along the support 330 or may rotate about the support 330.

The imaging unit 100 may be not only coupled to the conveying unit 300, as described above, but also formed at each of a plurality of positions where the sensing mark 10 can be imaged inside the frame 410. The installation position and number of the imaging unit 100 may depend on the process.

However, it may be advantageous that the imaging unit 100 is coupled to the conveying unit 300 in terms of space use and process efficiency, and it is exemplified that the imaging unit 100 is coupled to the conveying unit 300 in the present disclosure. It is apparent that the fundamental principle is the same even when the imaging unit 100 is installed at a plurality of positions.

The imaging unit 100 includes a position sensor 110, and information about position and posture changes of the imaging unit 100 collected by the position sensor 110 can be transmitted to the measuring unit. The measuring unit transmits a control signal to the driver 320 by analyzing the information about position and posture changes of the imaging unit 100 received from the position sensor 110, whereby the position and posture of the imaging unit 100 can be controlled. The information obtained by the position sensor 110 may be transmitted to the measuring unit in a wired or wireless type.

The imaging unit 100 that images one sensing mark 10 can image a position change of the sensing mark 10 only if it images the sensing mark 10 while maintaining a reference position, which is the reference for imaging the sensing mark 10. Accordingly, the position of the imaging unit 100 can be controlled such that the position, posture, and optical axis of the imaging unit 100 are maintained for one sensing mark 10.

Information about the position for imaging each sensing mark 10 may be stored in the measuring unit. When the imaging unit 100 is moved by the conveying unit 300 to image one sensing mark 10, the measuring unit can transmit a control signal to the conveying unit 300 so that the imaging unit 100 can perform imaging while maintaining the posture and optical axis suitable for imaging the sensing mark 10 at the reference position for imaging the sensing mark 10.

Such control of the posture and optical axis of the imaging unit 100 may be performed in the same way even when the imaging unit 100 is coupled to the frame 410. When the imaging unit 100 is fixed to a portion of the frame 410 and images a sensing mark 10, the position of the imaging unit 100 can be controlled such that the imaging unit 100 performs imaging while maintaining the posture and optical axis suitable for imaging the sensing mark 10 at the reference position for imaging the sensing mark 10. In this case, the driver 320 may be coupled between the imaging unit 100 and the frame 410 to control the position of the imaging unit 100.

FIGS. 4A-4D and 5A-5D are images of sensing marks 10 according to a plurality of embodiments of the present disclosure. FIGS. 6A-6D are images for analysis of a sensing mark 10 according to an embodiment of the present disclosure.

Figure 5A:
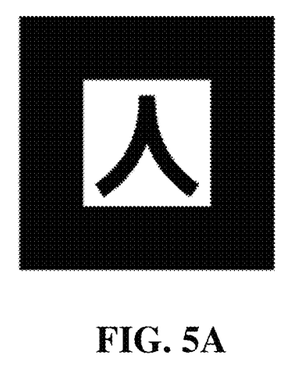
Figure 5B:
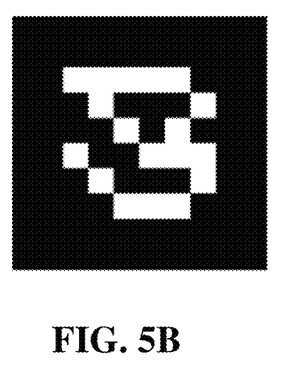
Figure 5C:
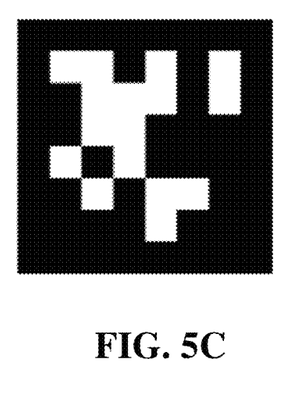
Figure 5D:
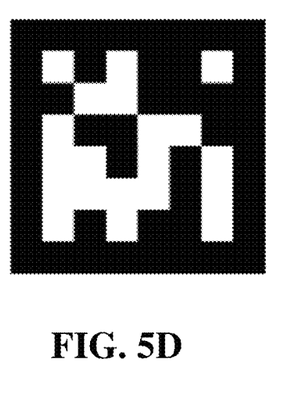

FIGS. 4A-4D are images of AprilTags of different embodiments. FIG. 5A is an image of an ARToolKit, FIG. 5B is an image of an ARtag, FIG. 5C is an image of an AprilTag, and FIG. 5D is an image of an Aruco marker.

Figure 6A:
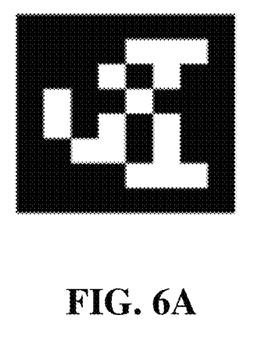
FIGS. 6A-6D are images for analysis of a sensing mark according to an embodiment of the present disclosure.
Figure 6B:
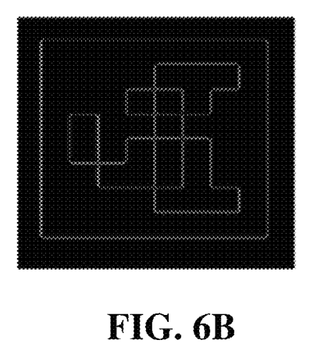
Figure 6C:
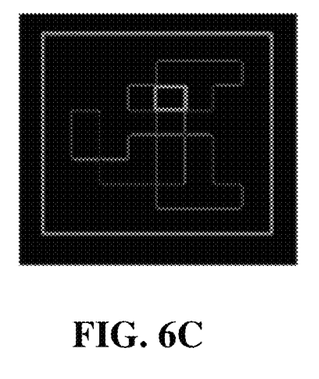
Figure 6D:
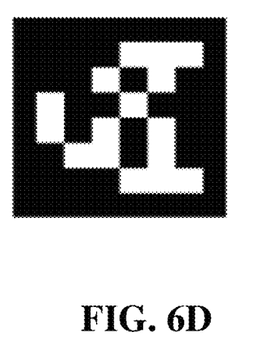

FIGS. 6A-6D are images for analysis of a sensing mark 10 according to an embodiment of the present disclosure. In detail, FIG. 6A is an original image taken by the imaging unit 100, FIG. 6B is an image that shows sensing of lines in the original image, FIG. 6C is an image that shows sensing of all quads, and FIG. 6D is an image that shows extraction of a quad having a valid code system from the image.

As shown in FIG. 6A, the imaging unit 100 creates an original image by imaging the sensing mark 10, and the original image can be transmitted to the measuring unit. As shown in FIG. 6B, the measuring unit can sense lines in the image of the sensing mark in the original image using least square method (LSM) in clusters of similar pixel gradients.

Next, as shown in FIG. 6C, quads can be sensed as many as possible in the gradient directions, and then, as shown in FIG. 6D, a quad having a valid code system can be extracted from the original image. The measuring unit obtains the pose of the sensing mark (AprilTag) 10 in the original image using homograph and intrinsic estimation, measures a coordinate change of each of the apexes of the outermost rectangle, and measures 3D inclination or movement, thereby being able to derive an image variation value of the sensing mark 10.

Further, it is possible to derive 3D position variation values of the frame 410, the machining unit, and the conveying unit 300 having the sensing mark 10 by analyzing 3D inclination (angle variation values in X, Y, and Z axes, $\theta x$, $\theta y$, and $\theta z$) or 3D position variation values x, y, and z of the sensing mark 10.

When the apparatus of the present disclosure is in operation, angle variation values $\theta x$, $\theta y$, and $\theta z$ in the X, Y, and Z axes or position variation values x, y, and z in the X, Y, and Z axes may be generated due to spacing at joints by changes in tension, compressing, bending, shearing, twisting, etc. and accumulation of vibration in operation at portions of each part of the machining unit or the frame 410. In this case, 3D inclination or movement may be generated at the sensing mark 10.

The measuring unit can derive 3D coordinate variation values at each portion of the sensing mark 10 by analyzing 3D inclination or movement of the sensing mark 10 using a predetermined program, and can derive 3D position variation values of the frame 410, the machining unit, the conveying unit 300, etc. having the sensing mark 10 using the derived 3D coordinate variation values.

Data obtained for each case by performing simulation on the 3D coordinate variation values of each portion of the sensing mark 10 due to 3D inclination or movement of the sensing mark 10 are stored in the program. It is possible to derive a 3D coordinate variation value of each portion of the sensing mark 10 by comparing a reference image of the sensing mark 10 based on the stored data with data about 3D inclination or movement of the sensing mark 10 in an original image.

The measuring unit can transmit a control signal to the machining unit or the conveying unit 300 so that the 3D position of the machining unit or the conveying unit 300 is corrected in accordance with the 3D position variation value of the frame 410, the machining unit, or the conveying unit 300.

In this case, the imaging unit 100 can continuously image the sensing mark 10, and original images can be transmitted to the measuring unit. When an original image and the reference image of a corresponding sensing mark 10 are the same, the measuring unit can determine that the machining unit has been moved or rotated to a predetermined position and can finish controlling the machining unit. Control of the machining unit may include control of each of the machining tool 210, the machining base 220, the tool actuator 230, and the base actuator 240. This configuration can be applied in the same way to control of the conveying unit 300.

As a detailed embodiment, as shown in FIG. 2, one module may be formed by forming the machining unit in a housing 420. A plurality of such modules may be formed and each of them may be coupled to the frame 410. In this configuration, the imaging unit 100 can image the machining unit formed in each of the modules, and accordingly, a control signal is transmitted to the plurality of machining units from the measuring unit, whereby each of the machining unit can be controlled.

Further, as shown in FIG. 3, a linear motor 341 and a rotary motor 342 may be provided as a configuration corresponding to the driver 320. An end of the supporting arm 310 may be coupled to the linear motor 341 and the other end of the supporting arm 310 may be coupled to the imaging unit 100. Further, the imaging unit 100 itself may tilt, rotate, etc. a camera provided in the imaging unit 100, and the imaging range of the camera may be increased.

Further, the conveying unit 300 may include a motor support 350 vertically elongated inside the frame 410 and supporting the linear motor 341 and the rotary motor 342 may be coupled to the bottom of the motor support 350, so the rotary motor 342 rotates the motor support 350, whereby the imaging unit 100 can be rotated.

As described above, when the measuring unit receives information from the position sensor 110 of the imaging unit 100, the measuring unit transmits a control signal to one or more of the linear motor 341, the rotary motor 342, and a servo motor, thereby being able to control 3D movement and rotation of the imaging unit 100. Further, the measuring unit transmits a control signal to the conveying unit 300 to change the imaging position from one sensing mark 10 to another sensing mark 10, thereby being able to change the position of the imaging unit 100.

Further, the sensing mark 10 may be formed on fixed components such as the motor support 350 and the rotary motor 342, it is possible to image a sensing mark 10 of the fixed components through other imaging units 100 installed on the frame 410, and the measuring unit can measure 3D position or rotation variation values of each of the fixed components using original images obtained in this case.

Further, the frame 410 may be included in the fixed component, and the imaging unit 100 images the sensing mark 10 formed on each portion of the frame 410 and the measuring unit analyzes the image, whereby it is possible to measure deformation (3D position or twist variation value) of a portion of the frame 410.

Further, when the measuring unit determines that a fixed component has been 3-dimensionally moved, rotated, or deformed, the measuring unit can transmit information of the determination to an electronic device of a user and the user can correct wrong position and posture of the fixed component. Accordingly, it is possible to quickly take measures against problems with each of the components in the apparatus.

Hereafter, a method of correcting an assembly deviation and process error using the apparatus of the present disclosure is described.

In a first step, an original image of a sensing mark 10 can be taken by the imaging unit 100. Further, in a second step, the measuring unit can derive an image variation value of the sensing mark 10 by analyzing the original image transmitted from the imaging unit 100.

Next, in a third step, the measuring unit can derive a 3D position variation value of the machining unit. Thereafter, in a fourth step, the measuring unit transmits a control signal to the machining unit, whereby the 3D position of the machining unit can be corrected.

The other details of the method of correcting an assembly deviation and a process error according to the present disclosure are the same as those of the apparatus of the present disclosure described above.

It is possible to minimize a process error due to each component by correcting the 3D position value of each component by reflecting deviations that are caused by gaps and tolerances when an apparatus is assembled and driven by continuously monitoring in real time position variation values and angle variation values θx, θy, and θz in X, Y, and Z axes of each of a frame, a machining unit, a conveying unit, an actuating unit, a measuring unit, a flexure, etc. that constitute an apparatus, by using the apparatus and method of the present disclosure described above. That is, it is possible to improve the quality of products that are manufactured by the apparatus of the present disclosure by minimizing an assembly deviation of equipment, which is assembled by the apparatus of the present disclosure, a process error in another process, etc. Further, it is possible to prevent generation of accumulated tolerances by minimizing an error that may be generated in an assembly process of equipment (machining unit, etc.) itself installed in the apparatus of the present disclosure.

The present disclosure having the configuration described above has an effect that it is possible to minimize a process error due to each component by correcting the 3D position value of each component by reflecting deviations that are caused by gaps and tolerances when an apparatus is assembled and driven by continuously monitoring in real time position variation values and angle variation values θx, θy, and θz in X, Y, and Z axes of each of a frame, a machining unit, a conveying unit, an actuating unit, a measuring unit, a flexure, etc. that constitute an apparatus.

The effects of the present disclosure are not limited thereto, and it should be understood that the effects include all effects that can be inferred from the configuration of the present disclosure described in the following specification or claims.

The above description is provided as an exemplary embodiment of the present disclosure, and it should be understood that the present disclosure may be easily modified in other various ways without changing the spirit or the necessary features of the present disclosure by those skilled in the art. Therefore, the embodiments described above are only examples and should not be construed as being limitative in all respects. For example, the components described as a single part may be divided and the components described as separate parts may be integrated.

The scope of the present disclosure is defined by the following claims, and all of changes and modifications obtained from the meaning and range of claims and equivalent concepts should be construed as being included in the scope of the present disclosure.

What is claimed is:

1. An apparatus for correcting an assembly deviation and a process error thereof using a sensing mark, the apparatus comprising:
   a frame;
   a machining equipment disposed inside or outside the frame and configured to perform a predetermined process;
   a conveyer disposed inside or outside the frame and configured to perform predetermined conveying;
   at least one sensing mark disposed on the frame, the machining equipment, or the conveyer;
   an imaging camera disposed inside or outside the frame and configured to create at least one original image by imaging the at least one sensing mark; and
   a measuring processor configured to derive a 3D position variation value of the frame, the machining equipment, or the conveyer by deriving an image variation value of the at least one sensing mark by analyzing the at least one original image transmitted from the imaging camera configured to image the at least one sensing mark disposed on the frame, the machining equipment, or the conveyer, wherein the conveyer is coupled to the imaging camera and configured to three-dimensionally move the imaging camera to image the at least one sensing mark, and wherein the conveyer is configured to maintain a reference position of the imaging camera when the imaging camera images the at least one sensing mark.

2. The apparatus of claim 1, wherein the at least one sensing mark has an AprilTag, an Aruco marker, an ARtag, or an ARToolKit.

3. The apparatus of claim 1, wherein the measuring processor is configured to transmit a control signal to the machining equipment or the conveyer to correct a 3D position of the machining equipment or the conveyer in accordance with the 3D position variation value of the frame, the machining equipment, or the conveyer.

4. The apparatus of claim 1, wherein the at least one sensing mark has a carving, a print, or an attachment.

5. The apparatus of claim 1, wherein the conveyer is coupled to the imaging camera and the frame and configured to move the imaging camera.

6. The apparatus of claim 1, wherein the measuring processor is configured to sense lines in an image of the at least one sensing mark in the at least one original image using least square method (LSM) in clusters of similar pixel gradients.

7. The apparatus of claim 1, wherein the measuring processor is configured to derive the 3D position variation value of the frame, the machining equipment, or the conveyer having the at least one sensing mark by analyzing 3D inclination or movement of the sensing mark.

* * * * *